FIG. 2

Nov. 3, 1970   R. B. DOWNEY   3,537,784
MOTION PICTURE PROCESSING AND PROJECTION SYSTEM EMPLOYING
MULTIPURPOSE CASSETTE AND STRIP TAPE
Filed Nov. 18, 1968   4 Sheets-Sheet 2

FIG. 1

INVENTOR.
Rogers B. Downey,
BY Brown and Mikulka
and
Robert L. Berger
ATTORNEYS

United States Patent Office 3,537,784
Patented Nov. 3, 1970

3,537,784
MOTION PICTURE PROCESSING AND PROJECTION SYSTEM EMPLOYING MULTIPURPOSE CASSETTE AND STRIP TAPE
Rogers B. Downey, Lexington, Mass., assignor to Polaroid Corporation, Cambridge, Mass., a corporation of Delaware
Continuation-in-part of application Ser. No. 761,771, Sept. 23, 1968. This application Nov. 18, 1968, Ser. No. 776,481
Int. Cl. G03d 15/00
U.S. Cl. 352—130
26 Claims

ABSTRACT OF THE DISCLOSURE

A motion picture system utilizing film of the type from which the negative image must be removed after development in order to render the positive image suitable for projection purposes and in which the steps of development, stripping and projection are sequentially and simultaneously performed. A cassette may be employed having two releasably connected sections. In one section respective ends of a strip of film are permanently attached to reels for reversible transport across a film gate, while the other section contains processing fluid. Initially, when the two sections are connected together, such a cassette is adapted to be positioned in a camera for exposure purposes. Subsequently, the two sections are separated and mounted independently in a unique projector which includes means for drawing a loop of the film strip from the film gate of the cassette's first section into the processing fluid contained in its second section. A unique low cost strip tape assembly is replaceably mounted on the inside face of the projector's door so that a section of the strip tape is positioned in contact with a section of the developed film strip when the projector's door is closed. Specially devised features are employed to drive the strip tape assembly in synchronization with the motion of the film strip and projector's claw mechanism and to firmly press the developed film against the strip tape.

RELATION TO EARLIER FILED APPLICATION

This is a continuation-in-part of copending application Ser. No. 761,771, filed on Sept. 23, 1968.

BACKGROUND OF THE INVENTION

Field of invention

This invention relates to motion picture photography and, more particularly, to improved apparatus for simplified and rapid processing and projection of motion picture film.

Description of the prior art

Traditionally, motion picture photography for home use has involved the following procedures:

(1) Unexposed film is procured by a user.

(2) The user threads the film from a reel through the mechanism of a camera and then exposes the film as desired.

(3) The exposed film is mailed to a processing laboratory.

(4) The laboratory processes the film, repackages it on a reel and returns it to the user.

(5) The user then mounts the reel in a projector, threads it through a mechanism of the projector to a take-up reel permanently retained therein and then projects it onto a screen.

The extended delay normally incurred between the time the exposed film is mailed to a laboratory and returned ready for viewing has proved to be a significant inconvenience to the user and a source of great annoyance.

Certain important improvements have been made in recent years to simplify the job of home motion picture photography. For example, cassette systems are now available which are adapted to be quickly mounted as a unit into a camera for exposure purposes. After the film has been exposed, the cassette containing the film can be quickly removed from the camera and mailed to a processing laboratory.

Even more recently, specially designed projectors have been marketed which utilize quick mounting cassettes containing the processed film. These system not only greatly ease the job of projecting the film, but also provide a permanent storage container for the film, i.e., the cassette, from which it is never necessary to withdraw the film for projection purposes.

However, neither of these significant improvements has solved the major inconvenience associated with home motion picture photography, i.e., the time delay between the taking of the film and its availability for projection. Additionally, while camera cassettes simplify the procedures for loading film into and removing film from a camera, they do not simplify the multistep laboratory development process which still requires repackaging of the film for projection purposes. Further, accessibility to film packaged in commercially available projector cassettes for the purpose of editing has not proved generally satisfactory.

The field of still photography is no longer hampered by extensive periods of delay between the time a picture is taken and the time when the finished product can be enjoyed. The impact on the public of the one-step photographic process employing diffusion transfer techniques is a matter of record and generally well known. The home photographer can now see the fruits of his efforts in a matter of seconds. This important convenience has been available to the still photographer for many years. However, his fellow hobbyist, interested in motion pictures, has had until now to wait a matter of days and even, in some instances, weeks before he could see the results of his work. The motion picture arts have lacked a simplified exposing, processing and projecting system which can be operated by any amateur photographer and which assures quick and easy access to and projection of fully processed film.

In commercial and industrial operations such a rapid processing and projection system will not only prove to be an improvement as a matter of convenience, but will have other important effects as well. For instance, motion picture news-reel programs can now be presented on television to the viewing public shortly after events of interest have occurred and been photographed.

The aforementioned copending application was directed to overcoming the above noted limitations of heretofore devised systems utilizing motion picture film of a type from which the developed negative image-bearing stratum need not be removed in order to render the film suitable for projection purposes. The present invention overcomes these limitations of prior systems utilizing film of the type from which the stratum containing the developed negative image must be stripped prior to projection and provides a system which is readily usable by even amateur photographers to easily and quickly process and project exposed motion picture film.

It is therefore a primary object of this invention to provide a motion picture projector in which exposed film can be processed.

A further object of this invention is to provide a motion picture projector in which film can be sequentially and simultaneously processed and projected.

Another object of this invention is to provide a compact, low cost strip tape assembly which is readily replaceable in a processing system.

Another object of this invention is to provide efficient means for utilizing the motor of a projector to drive a strip tape assembly.

An additional object of this invention is to provide a motion picture projector in which film can be sequentially and simultaneously developed, stripped and projected.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

SUMMARY OF THE INVENTION

The preferred embodiment of this invention briefly comprises a unique projector in which motion picture film is sequentially and simultaneously developed, stripped and projected. It may advantageously utilize a compact cassette constituted by two releasably connected sections. The first section is provided with a film gate and contains reel means, to which the ends of a motion picture film strip are permanently attached and which, further, are adapted to reversibly transport the motion picture film across the film gate when connected to appropriate external drive means. In the second section of the cassette, development chemicals for the film are initially stored in a crushable container from which they can be subsequently released into a reservoir area of that section. Access means into the reservoir area are provided and an absorption material is positioned adjacent that area.

The cassette with its two separable sections connected together, is adapted to be utilized in a motion picture camera for exposure purposes. After the film has been exposed in the camera, the two sections may be separated and mounted individually in the specially devised projector.

A recess provided in the housing of the first section of the cassette is adapted to receive a mirror of the projector behind that portion of the film strip disposed across the film gate when this cassette section is mounted in the projector. Also, a slidably mounted idler of the projector is operable to draw a loop of the film from the film gate and to position it, through the access means of the developing section of the cassette, in the cassette's reservoir area.

A compact strip tape assembly comprising a strip tape coiled on a supply reel and connected to a takeup reel after passing over a pair of idlers is adapted to be quick mounted on the inside face of the projector's door. After drawing the loop of film from the film gate into the reservoir area of the cassette's developing section, closing of the projector door positions the section of strip tape disposed between the two idlers of the strip tape assembly internally of the drawn film loop and in abutting relationship with a section of the film strip extending between the second section of the cassette and the first section thereof. A wheel of the projector can then be displaced to firmly press the film against one of the strip tape assembly's idlers.

The loop of film returns, after having passed through the reservoir area and having contacted the strip tape to the film gate of the film handling section of the cassette. Just prior to its return to the reel means, the film strip comes into operable relationship with the optical system of the projector which includes the aforementioned mirror positioned behind the film strip in the recess of the film handling section of the cassette. Drive means of the projector engage the reel means of the film handling section of the cassette such that the loop of film is drawn from a supply reel through the development fluid in the cassette's reservoir area, into contact with the strip tape which removes its negative image-bearing layer, through the optical system whereby it may be projected on an appropriate screen, and thence onto a takeup reel in the film handling section of the cassette. Simultaneously, drive means of the projector also engage the takeup reel of the strip tape assembly and the wheel which has been displaced to firmly press the developed film against the strip tape.

After this developing, stripping and projection operation has once been performed, the door of the projector can be opened and the aforementioned wheel and slidably mounted idler of the projector manipulated to permit the film to return to its initial position across the film gate. At this time, the strip tape assembly can be quickly removed from the projector and, if desired, replaced with a new assembly containing a fresh supply of tape. The drive means of the projector can be operated to return the film from the cassette's takeup reel to its supply reel. Subsequent viewings of the film can be effected by operating the projector in the conventional, i.e., the projection only mode.

The means of the projector for receiving the developing section of the cassette may be rotatably mounted. Consequently, after the film strip has been processed and the film loop returned to its original position across the film gate, the film developing section can be rotated to bring the developing fluid in the reservoir area into contact with the absorption material contained therein. Thus, the developing fluid will be thereafter permanently retained by the absorption material within this section of the cassette. This section of the cassette can then be disposed of and the developed film permanently retained in the other section of the cassette for storage and subsequent projection purposes.

Editing of the film can readily be accomplished by withdrawing a loop including the section of interest from the film gate and removing sections thereof and/or adding sections thereto.

DESCRIPTION OF THE PREFERRED EMBODIMENT

A currently preferred embodiment of this invention makes use of a film structure which comprises both a photosensitive negative emulsion layer adhered to an image receiving layer to which a reversal image may be transferred by diffusion during development, and which requires subsequent removal of the layer containing its developed negative image. Typically, the developed negative image layer is removed by the use of a strip tape which is temporarily brought into contact with the film structure and to which the emulsion layer attaches itself with a stronger adhesive force than that between it and the image-receiving layer.

More specifically, in typical silver transfer-reversal processes for the projection of black-and-white images, a silver halide developer and a silver halide solvent are applied in an aqueous alkaline solution to a photoexposed silver halide stratum or emulsion, where they develop exposed silver halide to silver and react with unreduced silver halide to form a soluble silver complex. This complex, in order to form a positive print, is transferred and reduced to silver on a silver-receptive stratum upon which the silver halide stratum has been superimposed. As indicated, it has been the practice in order to render the positive image suitable for projection purposes, to separate the silver-receptive and silver-halide strata from the stratum containing the positive print by the use of a strip tape.

Typical suitable film structures of this type as well as processing compositions for producing either fully developed full-color images or black-and-white images are shown in prior U.S. Pat. 2,726,154 of Edwin H. Land which issued on Dec. 6, 1955. However, as will become apparent, in the present instance the film strip itself would comprise only the structure depicted in that patent less the chemicals contained in the pods and the backing layer associated with the pods, the processing fluid in the present case being contained in a section of a cassette and its viscosity appropriately adjusted, by limiting the amount of viscous agent therein, to make it compatible with the operating parameters of the present system.

It should be noted that the present invention is not directed to the chemistry by which images are developed in the photosensitive emulsion and transferred to an image-receiving stratum. However, in the practice of the invention, whether the film employed is black-and-white film or color film, it is preferably of a type from which the developed negative image-bearing emulsion must be removed after development in order to render it suitable for projection purposes.

Figure 1:
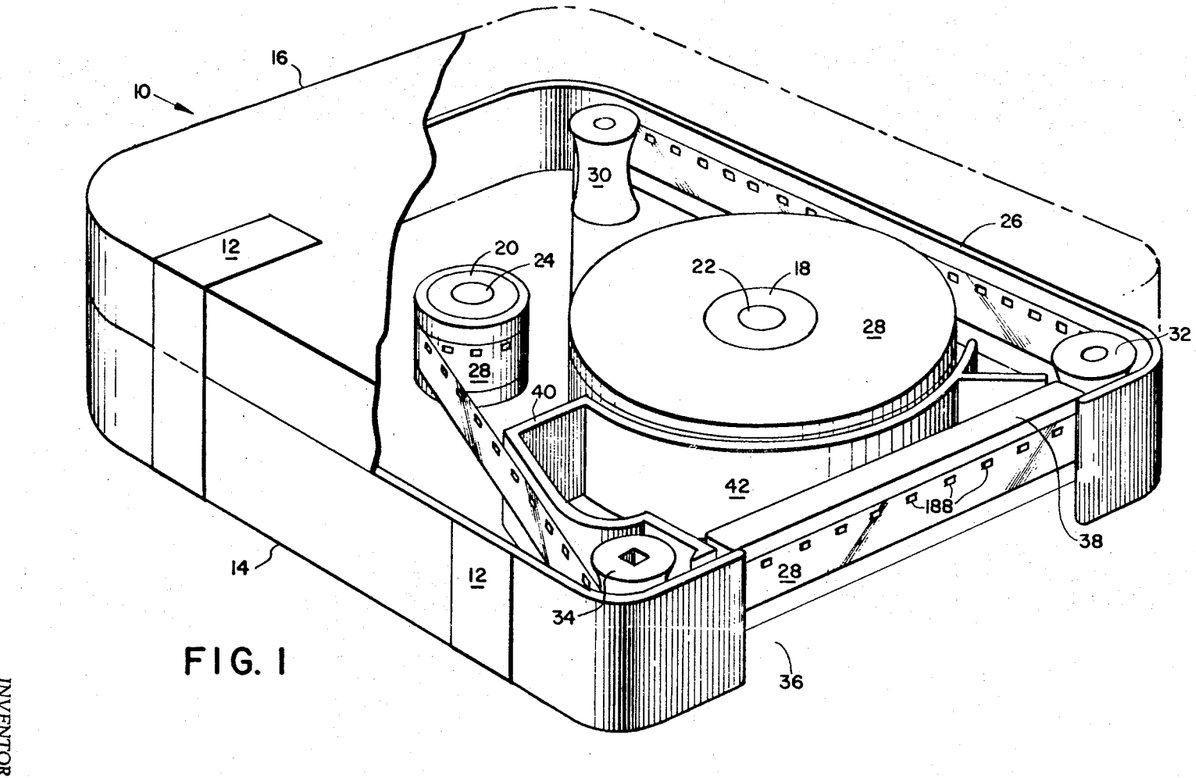
FIG. 1 is a perspective view, partially in section, of a motion picture film cassette suitable for use in connection with this invention.

Referring now to FIG. 1 of the drawings, a motion picture film cassette 10 is shown which can be utilized in exposing, processing, projecting and editing operations. The cassette 10 is constituted by two separate sections releasably connected together by strips of tape 12. A first section 14 may be considered the film handling section, while a second section 16 may be considered the film developing section.

The film handling section 14 may advantageously take the form of the film handling sections of the cassettes described in copending applications Ser. No. 761,756 of Gerald H. Cook, filed Sept. 23, 1968; Ser. No. 761,771 of Rogers B. Downey, filed Sept. 23, 1968, and Ser. No. 783,242 of Rogers B. Downey, filed Dec. 12, 1968, all of which applications are assigned to the assignee of the present invention.

As illustrated in FIG. 1, the film handling section 14 contains a supply reel 18 and a takeup reel 20 mounted on parallel pins 22, 24, respectively, for rotation within its housing 26. Respective ends of a strip 28 of motion picture film of the type previously described are permanently affixed to the supply reel 18 and the takeup reel 20. The film strip 28 in unexposed condition is initially coiled on the supply reel 18 and sequentially passes around idlers 30, 32 and 34 in reaching the takeup reel 20. In traveling between idlers 32 and 34, the film strip 28 traverses a film gate 36 provided in the housing 26. Removably positioned behind the film strip 28 and the film gate 36 is a pressure plate 38 which provides support for the film during exposure operations.

As will be explained in more detail in connection with the description of FIG. 2 of the drawings, the reels 18, 20 are appropriately arranged such that they can be connected to drive means external of the cassette 10. The film handling section 14 thus includes reel means which can be connected to external drive means to cause the film strip 28 to be reversibly transported across the film gate 36.

A portion 40 of the housing 26 is configured to provide a recess 42 behind the film 28 as it traverses the film gate 36. It will be noted that the pressure plate 38 initially partially occupies this recess 42. Accessibility into the film handling section 14 behind the film strip 28 is therefore provided for purposes which will subsequently become apparent.

The cassette 10, with its first section 14 connected to its second section 16 by the strips of tape 12, is configured so as to be adapted for quick mounting in a motion-picture camera (not shown). During the motion picture taking process, the reel means of the film handling section 14 engage the drive means of the camera such that the film strip 28 is transported in a proper intermittent manner across the film gate 36 from the supply reel 18 onto the takeup reel 20. Latent images are thereby recorded on the film strip 28.

Subsequent to the exposure process, the cassette 10 is withdrawn from the camera and its two sections 14 and 16 separated by removing the strips of tape 12. These sections 14, 16 of the cassette 10 are then adapted to be individually mounted in a projector 44 (see FIG. 2). In effect, the housing of the projector 44 consists of a frame member 46 enclosed by a rear panel 48 and a front panel 50. Hinged to, and forming part of, the front panel 50 is a door 52.

Figure 2:
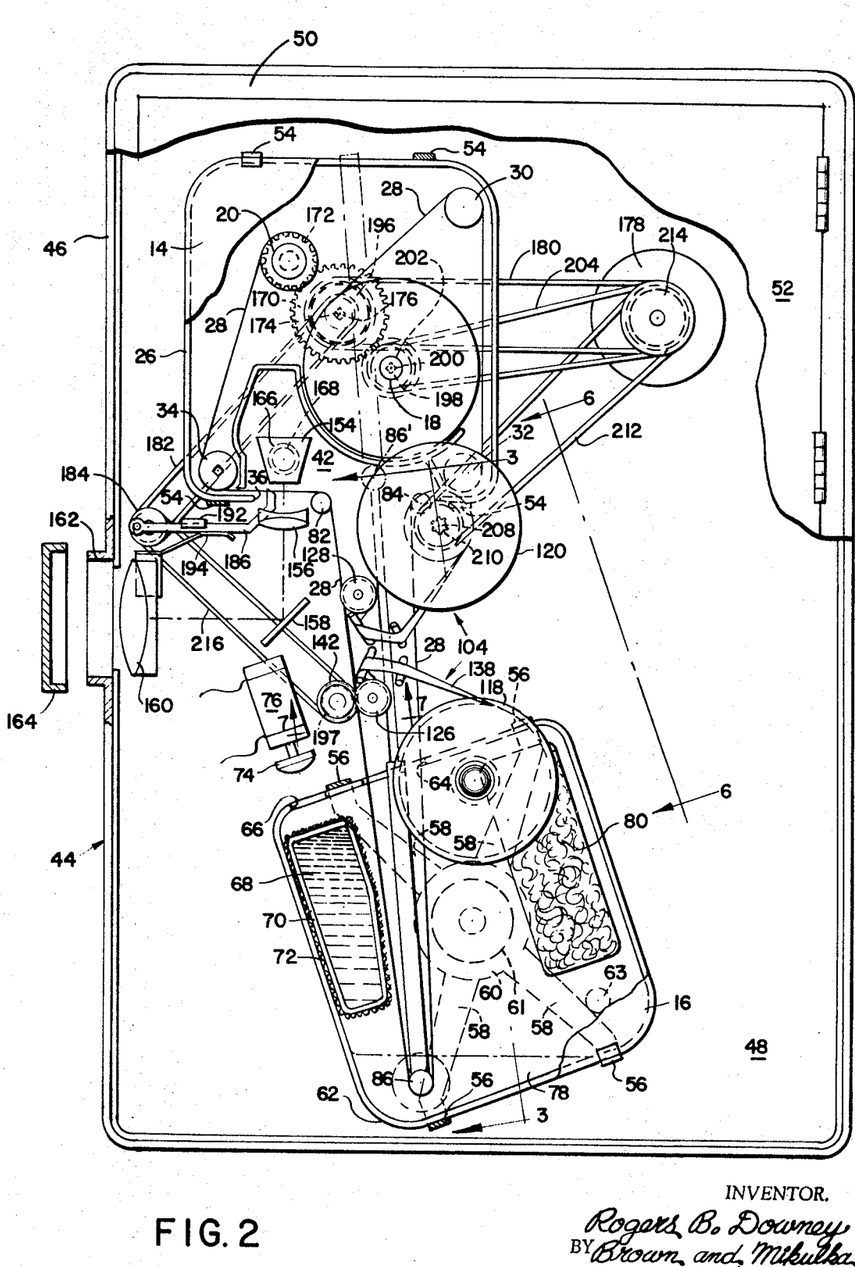
FIG. 2 is a first elevation view, partially in section, of a projector embodying features of this invention and in which the separate sections of the cassette illustrated in FIG. 1 are mounted.

As best seen in FIG. 2, the film handling section 14 of the cassette 10 is adapted to be mounted in spring clamps 54 which extend inwardly from the rear panel 48. Similarly, the film developing section 16 of the cassette 10 is adapted to be mounted in spring clamps 56 of the projector 44. However, in this latter instance, the spring clamps 56 are formed on or connected to the ends of spokes 58 extending radially from a hub 60. This hub 60 is rotatably mounted from the rear panel 48 of the projector 44 and operable by movement of a hand knob 61 (also see FIG. 4). As shown in FIG. 2, when initially mounted in the projector 44, one corner 62 of the developing section 16 is disposed below the other corners thereof. A pin 63 extending from the rear panel 48 and located between adjacent spokes 58, acts as a stop to limit the degree of rotation of the film developing section 16 in either direction within the projector 44.

The developing section 16 of the cassette 10 is provided with an aperture 64 and a recessed or weakened portion 66 for purposes to be more fully explained. Alternately, the aperture 64 may also take the form of a recessed or weakened portion of the developing section 16. Development chemicals 68, suitable for processing the film strip 28 after it has been exposed, are initially retained in a container 70. This container 70 may be formed of any suitable crushable or rupturable material compatible with the development chemicals 68 themselves. For instance, the container 70 may be formed of a lead sheathed plastic material or, as in the embodiment illustrated in the drawings, in a frangible glass vial. In the latter instance, the glass vial container 70 is enclosed by a woven mesh of material 72 such as cotton or nylon.

Mounted from the rear panel 48 so as to be positioned over the recessed or weakened portion 66 of the film developing section 16 is a plunger 74 driven by a solenoid 76. It will thus be recognized that, when the solenoid is energized, the plunger 74 will break through the weakened portion 66 of the film developing section 16 and crush the frangible glass vial container 70, thereby permitting the development fluid or chemicals 68 to flow through the woven mesh of material 72 into a reservoir area 78 of the cassette's development section 16. By initially mounting the film developing section 16 in the tilted position shown in FIG. 2, a reservoir area 78 of greater depth is obtained than would be possible if the section were mounted with the bottom of the reservoir aligned horizontally.

Also positioned within the film developing section 16 is a pad of absorption material 80, such as cotton, which is disposed above the development chemicals 68 when they are retained in the reservoir area 78. It will be appreciated that subsequent rotation of the hub 60 in a clockwise direction, as viewed in FIG. 2, will cause the development chemicals 68 to come into contact with and be absorbed by the absorption material 80.

After the pressure plate 38 has been removed from the film handling section 14 of the cassette 10 and this section initially mounted in the projector 44, the portion of the film strip 28 extending across the film gate 36 is positioned above a pair of idlers 82 and 84 which are rotatably mounted from the rear panel 48 of the projector. Also, a slidable idler 86 extending from the rear panel 48 of the projector 44 is initially positioned in the recess 42 of the cassette's film handling section 16 above this section of the film strip 28. The fully extended position to which this idler 86 can be caused to move in a manner to be described is illustrated in FIG. 2, while its initial position is shown in phantom in the same figure and designated 86'.

Figures 3, 4:
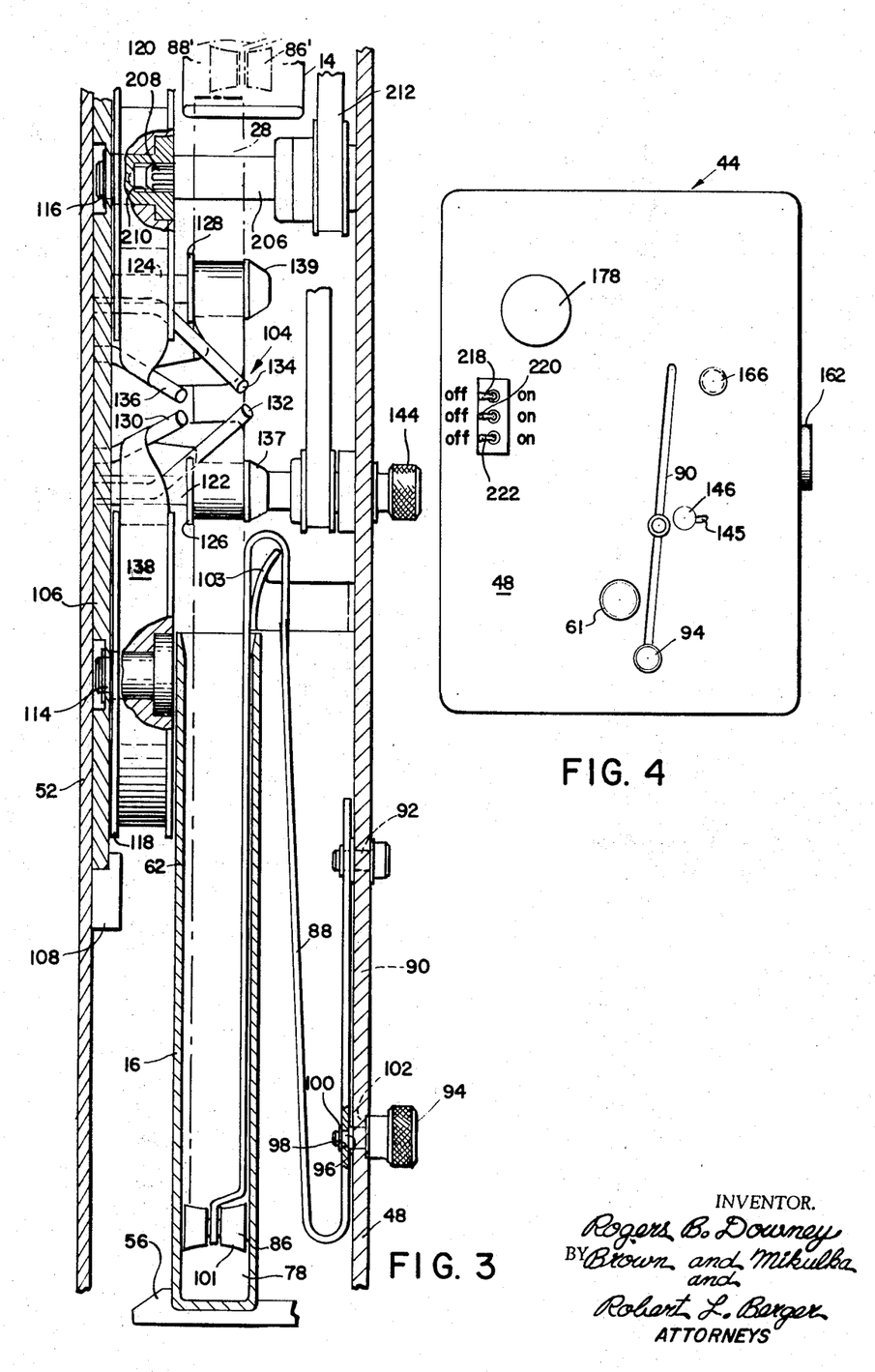
FIG. 3 is a view of the film loop drawing mechanism of the projector taken along line 3—3 of FIG. 2.
FIG. 4 is a rear elevation view of the projector illustrated in FIG. 2.
Figures 5, 7:
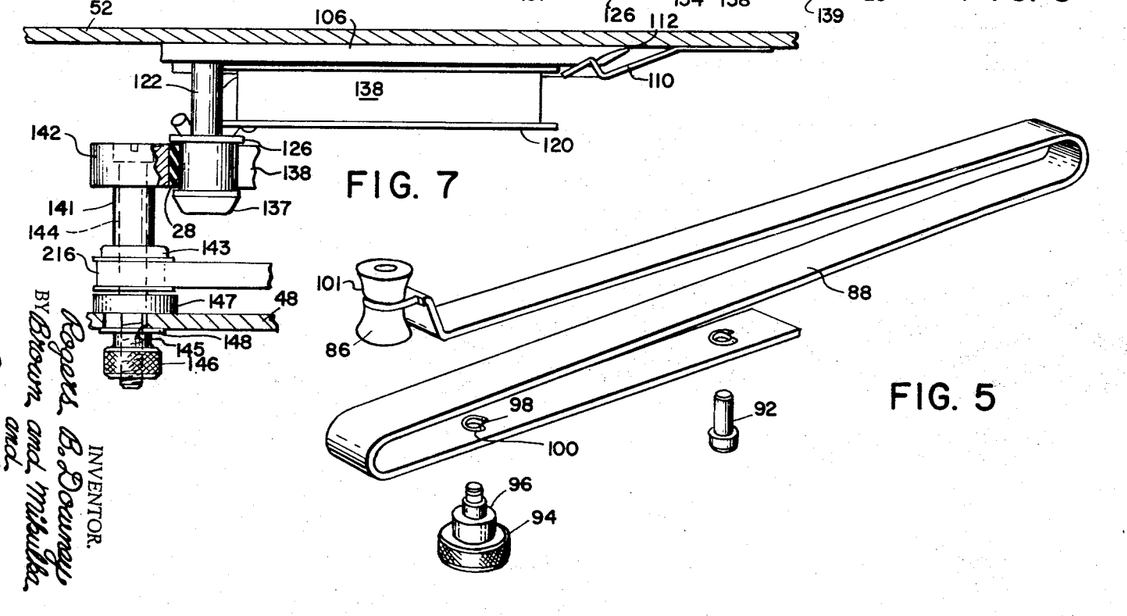
FIG. 5 is a perspective view of the spring component of the projector's loop drawing mechanism.
FIG. 7 is a view of the strip tape assembly of the projector taken along line 7—7 of FIG. 2.

Referring now to FIGS. 3, 4 and 5, the idler 86 is rotatably mounted at one end of an S-shaped spring member 88. Slidably positioned through a slot 90, provided in the rear panel 48 of the projector 44 and affixed to the other end of the S-shaped member 88, is a stud 92. A hand knob 94, operable from the exterior of the projector's rear panel 48, includes a pin 96 which passes through the slot 90 and an aperture 98 in the member 88, to which it is affixed by a locking ring 100. With one end of the S-shaped spring member 88 fixedly positioned with respect to the rear panel 48 by the stud 92, the natural forces in that member continually tend to pull the hand knob 94 against the rear panel. Consequently, as the spring member 88 is displaced from its initial position (shown in phantom in FIGS. 2 and 3) to its extended position by moving the hand knob 94 downwardly along the slot 90, the hand knob will automatically seat in a recess 102 provided in the rear panel 48 to lock that member in its fully extended position.

It will also be noted from FIG. 3 that the natural forces within the S-shaped spring member 88 initially position the idler 86 in the cassette's recess 42 such that it extends partially across the film strip 28. As the hand knob 94 is moved downwardly in the slot 90, the idler 86 first contacts the film strip 28 and, as it continues its downward path, its curved roller surface 101 will cause the loop of film strip to slide inwardly on the idler until it is centered thereon. Continuing its downward movement, the idler 86 engages a guide post 103 which extends inwardly from the rear panel 48 of the projector 44 and which urges the idler away from the rear panel permitting it to enter the cassette's film developing section 16 through its aperture 64. In this manner, a loop of film strip 28 is passed over and between idlers 82 and 84 and introduced into the reservoir area 78 of the film developing section 16 as depicted in FIG. 2.

Figure 6:
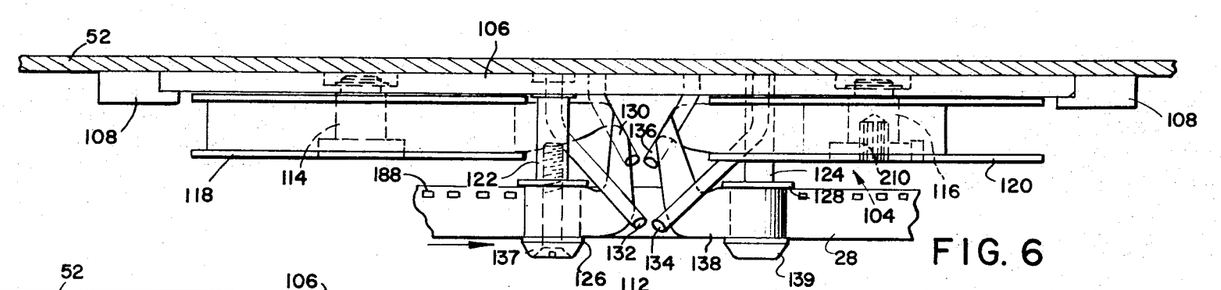
FIG. 6 is a view of the strip tape assembly of the projector taken along line 6—6 of FIG. 2.

Referring again to FIG. 2, and also to FIGS. 3, 6 and 7, it will be seen that the projector 44 also includes a strip tape assembly 104. This assembly 104 comprises a base plate 106 which facilitates its quick mounting on and removal from the inside face of the projector's door 52. In this connection the inside face of the door 52 is provided with flanged guide tracks 108 and an offset leaf spring 110 while the base plate 106 is provided with an angled groove 112. Consequently, the strip tape assembly 104 can be quick mounted in the projector 44 by engaging its base plate 106 with the flange guide tracks 108 and sliding it along the guide tracks until the offset leaf spring 110 seats in the angular groove 112. While the strip tape assembly 104 is thus substantially locked in position within the projector 44, it can be readily removed therefrom by pulling the assembly transversely along the guide tracks 108 with sufficient force to displace the offset leaf spring 110 out of the angular groove 112.

The strip tape assembly 104 also includes a pair of pins 114, 116 on which are rotatably mounted a supply reel 118 and a takeup reel 120, respectively. A second pair of pins 122, 124 extend from the assembly's base plate 106 and have idlers 126, 128 rotatably mounted thereon, respectively. It will be noted that the pins 114, 116, 122 and 124 extend in parallel relationship from the base plate 106 with the idlers 126 and 128 being positioned further from the projector's door 52 than the supply reel 118 and takeup reel 120. Four turning bars 130, 132, 134 and 136 extend from the base plate 106 and are oriented with respect thereto at carefully predetermined angles. One end of a roll of strip tape 138 is connected to the supply reel 118 and substantially the entire length of strip tape is initially coiled around this reel. The other end of the strip tape 138 is connected to the takeup reel 120 and, in reaching the takeup reel from the supply reel 118, the strip tape passes sequentially over turning bar 130, over turning bar 132, around idler 126, around idler 128, over turning bar 134 and finally over turning bar 136. The various parts of the strip tape assembly 104, excepting, of course, the strip tape 138 itself, can advantageously be formed of polymeric material utilizing low cost mass production techniques. As previously indicated, the resulting strip tape assembly 104 is readily adaptable for quick mounting in and removal from the projector 44.

The strip tape assembly 104 is positioned on the inside face of the projector door 52 such that, in the process of closing the door, tapered ends 137 and 139, respectively, of idlers 126 and 128 engage sections of the drawn loop of film strip 28 and urge the film strip outwardly and over the idlers themselves, whereby the idlers are positioned internally of the loop of film and a section thereof abuts the portion of strip tape 138 disposed between the idlers. A rotatable element 140 consisting of a tubular member 141 having a wheel 142 mounted on one end thereof and a pulley 143 mounted on its other end is rotatably positioned on a bolt 144. This bolt 144 extends through a curved slot 145 provided in the rear panel 48 of the projector 44 and is threaded to receive a hand nut 146. In order to maintain a normal alignment between the tubular member 141 and the rear panel 48, the bolt 144 is provided with a circular support member 147, which abuts the inside face of the rear panel, and a washer 148, disposed between the rear panel and the hand nut 146. It will be noted that the wheel 142 is disposed in alignment with the idler 126 on the opposite side of the film strip 28. Thus, after the door 52 of the projector 44 has been closed, the hand nut 146 can be manipulated to bring the wheel 142 into contact with the film strip 28 and to firmly press the film strip against that portion of the strip tape 28 disposed over idler 126.

The wheel 142 is preferably of larger diameter than is the idler 126 and its peripheral surface is preferably formed of a high friction material such as rubber. These two features, in combination, provide good traction between the wheel 142 and the film strip 28 after the hand nut 146 has been displaced to bring the wheel into the position where the film and strip tape 138 are gripped between it and the idler 126.

It is the function of the strip tape to pull the developed negative image-bearing layer from the film strip 28. Consequently, it should be formed of a material to which this layer of the film 28 bonds or adheres to a greater degree after the film has been passed through the processing fluid 68 than that layer is adhered at that time to the image-receiving layer of the film. Many commercially available materials are suitable for this purpose, for example, kraft paper or baryta paper.

Referring once again to FIG. 2, it will be seen that, after the loop of film strip 28 leaves the cassette's developing section 16 and has passed by the idlers 126 and 128 over which the strip tape 138 is disposed, it passes over idler 82 in reentering the film handling section 14 onto takeup reel 20. Appropriately positioned on the rear panel 48 of the projector are certain components of its optical system, i.e., a mirror 154 and a back lens 156. When the film handling section 14 of the cassette 10 is mounted in the spring clamps 54, the mirror 154 is positioned within the recess 42 behind the film strip 28, while the back lens 156 is positioned on the other side of the film strip in operable relationship with it and the mirror. The optical system of the projector 44 further includes a second mirror 158 and a front lens 160, the latter element being in registry with a flanged opening 162 provided in the frame member 46. A dust cap 164 snugly seats on the flanged opening 162 of the projector 44.

A light source 166 mounted on the rear panel 48 (see FIGS. 2 and 4) directs light through an opening 168 onto the mirror 154 from which it is reflected throuhg the film strip 28, through the back lens 156, onto the mirror 158 and thence through the front lens 160 and out the projector's flanged opening 162.

As may also be seen in FIG. 2, the reel means of the cassette's film handling section 14 includes a spur gear 170 connected to a pinion 172 on the takeup reel 20. When the film handling section 14 is mounted in the projector 44, a recess 174 of the spur gear 170 receives a drive shaft 176 extending from the projector's rear panel 48 and rotatably mounted thereto. The drive shaft 176 in turn is connected to a motor 178 of the projector 44 by a belt 180. The drive shaft 176 also supplies power, through a belt 182, a wheel 184 mounted from the rear panel 48, and a claw member 186 eccentrically mounted on the wheel 184 and adapted to engage sprocket holes 188 of the film strip 28, to intermittently advance the film strip across the film gate 36. The wheel 184 is further connected to the wheel 142 by a belt 216 and a slip clutch 197. Additionally, as is conventional, a rotating blade shutter (not shown) is mounted to the projector's rear panel 48, so as to be disposed between the light source 166 and the mirror 154 and geared or otherwise appropriately connected to the mechanism driving the claw member 186. Support for the claw member 186 is provided by a guide member 192 and a spring 194 mounted on the rear panel 48 of the projector 44. A conventional clutch 196 cooperating with the drive shaft 176 provides means for selectively engaging the spur gear 170 of the film handling section 14 and the claw member 186 with the projector's motor 178. The takeup reel 20 and its associated pinion 172 are mounted so that the takeup reel actually maintains a constant tension on the film strip 28 as is conventional.

Also, when the cassette's film handling section 14 is mounted in the spring clamps 56, a recess 198 of the supply reel 18 receives a drive shaft 200 rotatably mounted to the projector's rear panel 48. This drive shaft is connected to the motor 178 through a conventional clutch 202 by a belt 204.

A drive shaft 206 (see FIG. 3) provided with a spline 208 is rotatably mounted from the rear panel 48 of the projector 44 and positioned to engage an appropriately configured recess 210 of the strip tape takeup reel 120 when the projector's door 52 is closed. This drive shaft 206 is connected to the motor 178 by a belt 212 through a slip clutch 214.

It will be recognized that, with the clutch 196 engaged and the clutches 197, 202 and 214 disengaged, the motor 178 may be energized to drive the film strip takeup reel 20, whereby the film strip 28 will be drawn from the supply reel 18 across the film gate 26 onto the takeup reel 20. Simultaneously, the claw member 186 will engage the sprocket holes 188 of the film strip 28 to provide intermittent movement of the film across the projector's optical system as is conventional and the shutter operated in synchronization therewith. Also, by proper manipulation of the hand knob 94 and the hand nut 144 and engagement of clutches 197 and 214, a loop of the film strip can be passed through the reservoir area 78 of the cassette's development section 16 and into subsequent firm contact with the strip tape 138, as it travels from its supply reel 118 to its takeup reel 120, prior to its coming into operable relationship with the projector's optical system and coiled on the takeup reel 20.

With the film strip 28 disposed in its initial position across the film gate 36 and with the clutches 196, 197 and 214 disengaged and the clutch 202 engaged, the motor 178 can be energized to return the film strip 28 from its takeup reel 20 to its supply reel 18.

OPERATION OF THE PREFERRED EMBODIMENT

To summarize the operation of the preferred embodiment of this inventon, the cassette 10 with its film handling section 14 and film developing section 16 connected together by pieces of tape 12 is adapted to be quickly mounted in a motion picture camera. The reel means of the film handling section 14 engage the camera's drive means whereby an operator can selectively record images on the film strip 28 as it traverses the film gate 36 in passing from the supply reel 18 to the takeup reel 20. During the picture-taking operation, the film 28 is supported across the film gate 36 by the removable pressure plate 38. After the film strip 28 has been completely exposed, the cassette 10 can be quickly removed from the camera and replaced, when desired, by an identical cassette containing unexposed film.

After exposure, the tapes 12 can be removed from the cassette 10, to separate its film handling section 14 from its film developing section 16, and the pressure plate 38 removed from the former section. These sections 14 and 16 can then be independently mounted in the spring clamps 54 and 56, respectively, of the projector 44 and the door 52 closed. Turning a toggle switch 218 (see FIG. 4) mounted on the outside of the projector's rear panel 48 to its "on" position engages clutch 202 and energizes the motor 178 whereby the exposed film strip 28 is returned to the supply reel 18. Conventional means automatically return the toggle switch 218 to its "off" position when the film strip 28 is completely coiled on the supply reel 18.

By then opening the door 52 and displacing the hand knob 94 to its lowermost position on the projector 44, the idler 86 will engage the section of film strip 28 disposed across the film gate 36 and draw a loop thereof from the cassette's film handling section 14 and insert a portion thereof in the reservoir section 78 of the cassette's development section 16 through its aperture 64. With the projector door 52 open, the projector 44 can be loaded with a strip tape assembly 104 by sliding the assembly's base plate 106 along the guide tracks 108 until the leaf spring 110 seats in the angled groove 112. Closing the door 52 will position the section of the strip tape 130 disposed between the idlers 126 and 128 in abutting relationship with a section of the loop of film strip 28 and interiorly of the film loop. Simultaneously the spline 208 of the shaft 206 will engage the recess 210 of the strip tape takeup reel 120.

The hand nut 146 can be displaced along the slot 145 to firmly press the film strip 28 against the strip tape 138 between the wheel 142 and the idler 126. For reasons which will become obvious, the film strip 28 should include a nonphotosensitive leader section approximately equivalent in length to that portion of the film strip between the idler 32 and the takeup reel 20 when the separate sections 14 and 16 of the cassette are mounted in the projector and the hand knob 86 has been displaced to its lowermost position (see FIG. 2).

The dust cap 164 should be removed from the flanged opening 162 and a projection screen (not shown) appropriately positioned in front of the flanged opening. The solenoid 76 is energized by throwing a toggle switch 220 (see FIG. 4) provided on the exterior of the rear panel 48 of the projector 44, from its "off" to its "on" position. When energized, the solenoid 76 drives the plunger 74 through the weakened portion 66 of the cassette's developing section 16 and into contact with the glass vial container 70 which is instantaneously crushed thereby. The development chemicals 68, initially contained in the container 70, then flow through the mesh 72 into the reservoir area 78 of the development section 16 and, consequently, some into contact with that portion of the film strip 28 positioned therein.

After the development chemicals 68 have had sufficient time to fill the reservoir area 78 of the cassette's film developing section 16, a conventional time delay circuit connected to the toggle switch 220 engages the clutches 196, 197 and 214, and energizes both the motor 178 and the light source 166. Consequently, in this mode, the film strip 28 is drawn from the supply reel 18 through the development chemicals 68 in the reservoir area 78 of the cassette's developing section 16, into contact with the strip tape 138 which simultaneously progresses from its supply reel 118 to its take-up reel 120, and between the mirror 154 and the back lens 156 onto the takeup reel 20 of the cassette's film handling section 14. During this operation, intermittent motion is transmitted to the film strip 28 as it passes in front of the mirror 154 by the claw member 186.

As the film 28 passes through the development chemicals 68 in the reservoir area 78, the latent images recorded thereon are developed and, as the strip tape 138 is subsequently brought into contact therewith and then taken out of contact therewith the developed negative stratum is removed rendering the remaining positive image suitable for projection purposes. As the film strip 28 passes in front of the mirror 154, which receives light from the light source 166, the developed images are projected by these and other elements of the optical system, i.e., back lens 156, mirror 158 and front lens 160, through the flanged opening 162 of the projector 44, onto the aforementioned screen where they can be viewed. Consequently, a highly compact and efficient system is provided for sequentially and simultaneously processing and projecting motion picture film.

Conventional means (not shown) are connected to the toggle switch 220 to return that element automatically to its "off" position when all of the exposed film 28 has been uncoiled from the supply reel 18 passed across the film gate 36. Thus, at this point, the clutches 196, 197 and 214 are disengaged and the motor 178, the light source 166 and the solenoid 76 deenergized, the plunger 74 automatically returning to its original position.

The dust cover 164 may be repositioned on the flanged opening 162 and the hand nut 146 returned to its original position in slot 145 to withdraw the wheel 142 out of contact with the film 28. Then opening of the door 52 permits the strip tape assembly 104 to be replaced with a fresh assembly and the idler 86 to be returned to its original position by drawing the hand knob 94 out of the recess 102 and moving it to its uppermost position along the slot 90. For obvious reasons, the end of the film strip attached to the supply reel should consist of a nonphotosensitive leader substantially the same length as that on the end attached to the takeup reel 20. With the door 52 opened, the takeup reel 20 should be manually rotated to draw the nonphotosensitive leader taut across the film gate 36 of the cassette's film handling section 14. The door should then be closed and the toggle switch 218 again returned to its "on" position to rewind the film strip 28 onto the supply reel 18. As previously explained, when the film strip 28 is completely coiled on the supply reel 18, the toggle switch 218 automatically returns to its "off" position deenergizing the motor 178 and disengaging the clutch 202.

At this time the hand knob 61 should be turned to effect a rotation of the cassette's film developing section 16 within the projector 44 whereby the development chemicals 68 are brought into contact with the absorption pad 80 for permanent and safe retention therein. The door 52 can be opened and the cassette's film developing section 16 removed from the spring clamps 56 and disposed of as desired. The cassette's film handling section 14 can be removed from the spring clamps 54 and permanently retained for subsequent viewings.

For additional viewings of the exposed and developed film in the film handling section 14, it is only necessary to again mount the film handling section in the spring clamps 54, to shut the door 52, to remove the dust cap 164, to set up the screen (not shown) and to move a toggle switch 222 (see FIG. 4) mounted on the rear panel 48 to its "on" position. In this position, only the clutch 196 is engaged and only the motor 178 and the light source 166 energized. The film strip 28 is then drawn by the takeup reel 20 and claw member 186 directly across the film gate 36 for projection purposes only. Again, when the film strip 28 is completely coiled on the takeup reel 20, the switch 222 automatically returns to its "off" position disengaging the clutch 196 and deenergizing the motor 178 and the light source 166. By then moving toggle switch 218 to its "on" position, the film will be returned to the supply reel 18 and the cassette's film handling section 14 can be removed from the projector 44 and stored as desired.

Editing of the developed film strip 28 can easily be effected. It is only necessary to draw a loop of the film strip 28 from the film gate 36 and to remove sections therefrom or to splice sections thereinto as desired.

Those familiar with the motion picture arts will readily appreciate the novel and highly unique advantages of this motion picture system. This system preferably utilizes a compact cassette structure usable in both a camera during exposure operations, and in a unique projector, for processing and/or projection operations. The processing and projection operations are effected simultaneously. Further, a compact, low cost and quickly replaceable strip tape assembly is employed in connection with unique means for bringing the strip tape into firm contact with the developed film and for engaging the strip tape assembly with the drive means of a projector. In the embodiment illustrated in the drawings the compatibility between the development chemicals and the motion picture film is assured at time of processing and the development chemicals are continually retained in the cassette structure itself in a hazard-free manner. In an overall sense and most importantly, this invention permits even the amateur photographer to view his motion pictures in an extremely short period of time after they have been taken.

This invention may be practiced or embodied in other ways without departing from the spirit or essental character thereof. For instance, if desirable, firm contact between the film strip 28 and the strip tape 138 as it travels from idler 126 to idler 128 can be further assured by the use of a plate disposed behind the corresponding section of film strip. Also, the entire strip tape assembly 104 can be slidably mounted on the projector door 52 so that the idlers 126 and 118 are initially positioned within the film loop and out of contact with the film strip 28 such that it can be subsequently displaced to bring the strip tape into firm contact with the film strip. Also, instead of the manual operation of the idler 86 as employed in the illustrated preferred embodiment of this invention, its operation to draw the loop of film strip from the film gate 36 can be completely automated. Also, in some applications wherein space is not critical, the supply reel 116 and takeup reel 118 of the strip tape assembly 104 can be mounted perpendicular to the base plate 106, in which case the number of turning bars can be reduced from four to two. The preferred embodiment described herein is therefore illustrative and not restrictive, the scope of the invention being indicated by the appended claims and all variations which come within the meaning of the claims are intended to be embraced therein.

What is claimed is:

1. A system for handling motion picture film, of the type including a photosensitive image-recording layer and an image-receiving layer adhered thereto and during the development of which an image is developed in said photosensitive layer and transferred by diffusion to said image-receiving layer to produce a visible reversal image therein, employing a film handling cassette, having a film gate and including means for transporting a strip of said film contained therein across said film gate when connected to external drive means, and a receptacle containing processing fluid for said film and having access means communicating with said fluid:

a housing;

first mounting means within said housing for receiving said film handling cassette after said film strip has been exposed;

second mounting means within said housing for receiving said receptacle;

drive means within said housing engaging said film transporting means when said film handling cassette is mounted in said first mounting means;

means within said housing for selectively drawing a loop of said film from said film gate and introducing a section of said loop into said fluid contained in said receptacle through said access means when said cassette and said receptacle are positioned in respective said mounting means, whereby said film strip is developed as said film strip passes through said processing fluid; and means for progressively bringing sections of a stripping material, having a greater adhering characteristic for said photosensitive layer of said film than said image-receiving layer of said film has for said photosensitive layer, into and then out of contact with a section of said loop on the photosensitive layer side of said developed film intermediate of said receptacle and said cassette, whereby said photosensitive layer of said film adheres to said stripping material when in contact therewith and is subsequently stripped by said stripping material from said image-receiving layer of said film.

2. The system of claim 1 additionally comprising means within said housing in operative relationship with said film strip on its return into said cassette after it has been treated by said processing fluid and said stripping material for projecting visible images contained thereon.

3. The system of claim 2 wherein said housing includes a panel having a door provided therein and wherein said means for progressively bringing sections of a stripping material into and then out of contact with said film includes a supply reel of stripping material and a takeup reel, to which one end of said stripping material is connected, mounted from the inside face of said door so that a portion of said stripping material between said supply reel and said takeup reel is positioned within said loop in contact with said film strip when said door is closed.

4. The system of claim 3 additionally including means for selectively connecting said takeup reel to said drive means.

5. The system of claim 3 wherein the planes of rotation of said supply reel and said takeup reel are other than the plane of said section of said film loop and wherein said means for progressively bringing sections of a stripping material into and then out of contact with said film additionally include a first and a second idler over which said stripping material is disposed between said supply reel and said takeup reel, said idlers being mounted from the inside face of said door for rotation in the plane of said section of said film loop with said portion of said stripping material in contact with said film strip disposed between said idlers, means mounted from the inside face of said door engaging said film strip intermediate of said supply reel and said first idler for directing said stripping material from said supply reel onto said first idler, and means mounted from the inside face of said door engaging said film strip intermediate of said second idler and said takeup reel for directing said stripping material from said second idler onto said takeup reel.

6. The system of claim 2 wherein a recess is provided in said film handling cassette behind said film gate and wherein said projection means includes a light reflecting element positioned within at least a portion of said recess behind said film strip.

7. The system of claim 1 wherein said means for progressively bringing sections of a stripping material into and then out of contact with said film includes at least one idler, over which said stripping material is passed, and means for pressing said film strip firmly against said stripping material disposed over said idler.

8. The system of claim 7 wherein said means for pressing said film firmly against said stripping material disposed over one of said idlers includes a wheel engaging said film strip and means for connecting said wheel to said drive means.

9. The system of claim 7 additionally comprising means within said housing in operative relationship with said film strip as it traverses a portion of said film gate on its return into said cassette after it has been treated by said processing fluid and said stripping material for projecting visible images contained thereon.

10. The system of claim 1 wherein said housing includes a panel having a door provided therein and wherein said means for progressively bringing sections of a stripping material into and then out of contact with said film includes a supply reel of stripping material and a takeup reel, to which one end of said stripping material is connected, mounted from the inside face of said door so that a portion of said stripping material between said supply reel and said takeup reel is positioned within said loop in contact with said film strip when said door is closed.

11. The system of claim 10 wherein the planes of rotation of said supply reel and said takeup reel are other than the plane of said section of said film loop and wherein said means for progressively bringing sections of a stripping material into and then out of contact with said film additionally include a first and a second idler over which said stripping material is disposed between said supply reel and said take-up reel, said idlers being mounted from the inside face of said door for rotation in the plane of said section of said film loop with said portion of said stripping material in contact with said film strip disposed between said idlers, means mounted from the inside face of said door engaging said film strip intermediate of said supply reel and said first idler for directing said stripping material from said supply reel onto said first idler, and means mounted from the inside face of said door engaging said film strip intermediate of said second idler and said takeup reel for directing said stripping material from said second idler onto said takeup reel.

12. The system of claim 11 additionally including means for selectively connecting said takeup reel to said drive means.

13. The system of claim 11 wherein said means for progressively bringing said sections of a stripping material into and then out of contact with said film additionally includes means for pressing said film strip firmly against said stripping material disposed over one of said idlers.

14. The system of claim 13 wherein said means for pressing said film firmly against said stripping material disposed over one of said idlers includes a wheel engaging said film strip and means for connecting said wheel to said drive means.

15. The system of claim 11 wherein said supply reel, said takeup reel and said idlers are mounted on parallel axes.

16. The system of claim 15 wherein said supply reel and said takeup reel are mounted in a first plane and said idlers are mounted in a second plane spaced therefrom.

17. The system of claim 10 additionally including means for selectively connecting said takeup reel to said drive means.

18. A system for stripping the photosensitive image-recording layer from a visible image-carrying sheet material of the type in which in the developing process an image has been developed in said photosensitive layer and transferred by diffusion to an image-receiving layer to which said photosensitive layer is adhered to produce a visible reversal image therein comprising:
   a housing;
   drive means mounted within said housing;
   a stripping station within said housing including an assembly removably mounted therein comprising a rotatably mounted supply reel of stripping material, having a greater adhering characteristic for said photosensitive layer of said sheet material than said image-receiving layer of said sheet material has for said photosensitive layer, a rotatably mounted takeup reel to which one end of said stripping material is connected, at least one idler over which said stripping material is disposed in passing from said supply reel to said takeup reel, the planes of rotation of said supply reel and said takeup reel being other than the plane of rotation of said idler, means engaging said film strip intermediate of said supply reel and said idler for directing said stripping material from said supply reel onto said idler and means engaging said film strip intermediate of said idler and said takeup reel for directing said stripping material from said idler onto said takeup reel;
   advancing means for said sheet material connected to said drive means for transporting said sheet material progressively through said stripping station with its said photosensitive layer passing in juxtaposition with at least that portion of said stripping material disposed over said idler;
   means for connecting said takeup reel to said drive means whereby said stripping material passes over said idler at substantially the same rate of speed that said sheet material is transported through said stripping station by said advancing means; and
   means for effecting firm contact between said sheet material and at least that portion of said stripping material disposed over said idler, the paths of said stripping material within said assembly and of said sheet material through said stripping station being arranged such that said stripping material and said sheet material are withdrawn from contact subsequent to their passing said idler whereby said photosensitive layer of said sheet material adheres to said stripping material when in firm contact therewith and is subsequently stripped by said stripping material from said image-receiving layer of said sheet material.

19. The system of claim 18 wherein said assembly includes a second idler, said idlers being mounted for rotation in the same plane and wherein said means for engaging said film strip intermediate of said one of said idlers and said takeup reel for directing said film strip onto said takeup reel engages said film strip intermediate of said second idler and said takeup reel and wherein the entire portion of said stripping material disposed between said idlers is in contact with said sheet material.

20. The system of claim 19 wherein said supply reel, said takeup reel and said idlers are mounted on parallel axes.

21. The system of claim 20 wherein said supply reel and said takeup reel are mounted in a first plane and said idlers are mounted in a second plane spaced therefrom.

22. The system of claim 18 wherein said means for effecting firm contact between said sheet material and at least that portion of said stripping material disposed over said idler includes a wheel rotatably mounted within said housing and means for causing said wheel to press said sheet material firmly against said stripping material disposed over said idler.

23. The system of claim 22 additionally including means for connecting said wheel to said drive means.

24. The system of claim 18 wherein said housing includes a door, said at least one idler has a conically tapered end and said assembly is mounted on the inside face of said door for rotation about an axis perpendicular to said door with said tapered end of said idler disposed further from said door than said other end of said idler whereby closing of said door causes said tapered end of said idler to initially engage a section of said sheet material within said stripping station on the photosensitive layer side thereof so that said sheet material is displaced from its initial position within said stripping station to slide over said idler and into contact and alignment with said stripping material passing over said idler.

25. A system for handling motion picture film of the type including a photosensitive image-recording layer and an image-receiving layer adhered thereto and during the development of which an image is developed in said photosensitive layer and transferred by diffusion to said image-receiving layer to produce a visible reversal image therein comprising:
   a housing including a rear panel and a front panel having a door provided therein and first and second mounting means;
   drive means within said housing;
   a cassette adapted to be positioned within a camera including a film handling section, adapted to be positioned in said first mounting means and having a film gate provided therein and including means for transporting a motion picture film retained therein across said film gate and means for releasably connecting said film transporting means to said drive means, and a film developing section, adapted to be positioned in said second mounting means releasably connected to said film handling section including means for carrying a quantity of processing fluid for said film and access means whereby a loop of said film drawn from said film gate may be introduced into said processing fluid when said film handling section and said film developing section are disconnected from each other and positioned in respective said mounting means and as said film is transported across said film gate by said film transporting means;
   means mounted from said rear panel for selectively engaging said film disposed across said film gate and drawing a loop of said film from said film gate and introducing said loop into said processing fluid of said developing section of said cassette through said access means when said cassette sections are positioned in respective said mounting means whereby said film can be exposed through said film gate when said cassette is mounted in said camera and developed when said film handling and film developing sections are positioned in said housing without disconnecting said film from said film handling section;
   an assembly, including a supply reel of stripping material having a greater adhering characteristic for said photosensitive layer of said film than said image-receiving layer of said film has for said photosensitive layer, a takeup reel to which one end of said stripping material is connected and at least one idler, over which said stripping material passes in reaching said takeup reel from said supply reel, mounted on the inside face of said door so that at least that portion of said stripping material passing over said idler is positioned within said film loop when said door is closed in contact with a section of said loop on the photosensitive layer side of said developed film intermediate said processing fluid and said film handling section of said cassette, the path of said stripping material between said idler and said takeup reel being arranged so that said stripping material is withdrawn from contact with said film subsequent to passing around said idler whereby said photosensitive layer adheres to said stripping material as it passes around said idler and is subsequently stripped from said image-receiving layer by said stripping material; and means within said housing in operative relationship with said film as it traverses a portion of said film gate after being treated by said processing fluid and said stripping material for projecting visible images contained thereon.

26. A system for handling motion picture film of the type including a photosensitive image-recording layer and an image-receiving layer adhered thereto and during the development of which an image is developed in said photosensitive layer and transferred by diffusion to said image-receiving layer to produce a visible reversal image therein:

a housing;

a film handling cassette, having a film gate and including means for transporting a strip of said film contained therein across said film gate when connected to external drive means, releasably mounted in said housing;

a receptacle containing processing fluid for said film and having access means communicating with said fluid mounted in said housing;

drive means within said housing engaging said film transporting means when said film handling cassette is mounted in said housing;

means within said housing for selectively drawing a loop of said film from said film gate and introducing a section of said loop into said fluid contained in said receptacle through said access means when said cassette and said receptacle are mounted in said housing; and means for progressively bringing sections of a stripping material, having a greater adhering characteristic for said photosensitive layer of said film than said image-receiving layer of said film has for said photosensitive layer, into and then out of contact with the photosensitive layer side of a section of said loop passing from said receptacle towards said cassette, whereby said photosensitive layer of said film adheres to said stripping material when in contact therewith and is subsequently stripped by said stripping material from said image-receiving layer of said film.

References Cited

UNITED STATES PATENTS 2,988,043   6/1961   Sassenberg __________ 352—130

DONALD O. WOODIEL, Primary Examiner

U.S. Cl. X.R.

352—78

UNITED STATES PATENT OFFICE
CERTIFICATE OF CORRECTION

Patent No. 3,537,784        Dated February 12, 1971

Inventor(s) Rogers B. Downey

It is certified that error appears in the above-identified patent and that said Letters Patent are hereby corrected as shown below:

Column 2, line 11, "system" read as --systems--. Column 6, line 1, "configurated" read as --configured--. Column 9, line 18, "throuhg" read as --through--. Column 12, line 51, "essental" read as --essential--. Column 13, line 12, "fluid:" read as --fluid comprising:--. Column 17, line 16, "therein:" read as --therein comprising:--.

Signed and sealed this 15th day of June 1971.

(SEAL)
Attest:

EDWARD M. FLETCHER, JR.
Attesting Officer

WILLIAM E. SCHUYLER, JR.
Commissioner of Patents